US006994919B2

(12) United States Patent
Wijenberg et al.

(10) Patent No.: US 6,994,919 B2
(45) Date of Patent: Feb. 7, 2006

(54) BRAZING PRODUCT AND METHOD OF MANUFACTURING A BRAZING PRODUCT

(75) Inventors: Jacques Hubert Olga Joseph Wijenberg, Amsterdam (NL); Adrianus Jacobus Wittebrood, Velserbroek (NL); Joop Nicolaas Mooij, Castricum (NL)

(73) Assignees: Corus Aluminium Walzprodukte GmbH, Koblenz (DE); Corus Technology BV, IJmuiden (NL)

( * ) Notice: Subject to any disclaimer, the term of this patent is extended or adjusted under 35 U.S.C. 154(b) by 155 days.

(21) Appl. No.: 10/621,601

(22) Filed: Jul. 18, 2003

(65) Prior Publication Data

US 2004/0115468 A1  Jun. 17, 2004

Related U.S. Application Data

(63) Continuation-in-part of application No. 10/060,117, filed on Jan. 31, 2002, now Pat. No. 6,796,484.

(30) Foreign Application Priority Data

Jul. 24, 2002  (EP) .................................. 02078054

(51) Int. Cl.
B32B 15/20 (2006.01)
C25D 7/06 (2006.01)
B23K 31/02 (2006.01)

(52) U.S. Cl. ...................... 428/650; 428/652; 428/654; 428/656; 428/658; 428/660; 428/668; 428/671; 428/681; 428/686; 428/925; 428/926; 428/935; 205/153; 205/154; 205/205; 205/238; 205/255; 205/259; 228/218; 228/219; 228/221; 228/262.5; 228/262.51

(58) Field of Classification Search ................ 428/650, 428/652, 654, 656, 658, 660, 668, 671, 681, 428/686, 925, 926, 935; 205/153, 154, 205, 205/238, 255, 259; 228/218, 219, 221, 262.5, 228/262.51
See application file for complete search history.

(56) References Cited

U.S. PATENT DOCUMENTS

| 2,745,799 A | 5/1956 | Patrie |
| 2,821,014 A | 1/1958 | Miller |
| 2,821,505 A | 1/1958 | Beach |
| 3,242,565 A * | 3/1966 | North et al. ................. 228/201 |
| 3,482,305 A | 12/1969 | Dockus et al. |
| 3,489,657 A | 1/1970 | Brenan et al. |
| 3,597,658 A | 8/1971 | Rivera |
| 3,692,583 A | 9/1972 | Mucenieks et al. |
| 3,862,018 A | 1/1975 | Mentone |
| 3,881,999 A | 5/1975 | Toth et al. |
| 3,896,009 A | 7/1975 | Kobayashi et al. |
| 3,963,454 A | 6/1976 | Singleton, Jr. |
| 3,970,237 A | 7/1976 | Dockus |
| 4,028,200 A | 6/1977 | Dockus |
| 4,097,342 A | 6/1978 | Cooke et al. |
| 4,126,522 A | 11/1978 | Edlund |
| 4,157,154 A | 6/1979 | Scott et al. |
| 4,164,454 A | 8/1979 | Schober |
| 4,177,325 A | 12/1979 | Roberts et al. |
| 4,346,128 A | 8/1982 | Loch |
| 4,388,159 A | 6/1983 | Dockus et al. |
| 4,397,721 A | 8/1983 | Exalto et al. |
| 4,602,731 A | 7/1986 | Dockus |
| 4,721,653 A | 1/1988 | Oda et al. |
| 4,741,811 A | 5/1988 | Lefebvre et al. |
| 5,069,980 A | 12/1991 | Namba et al. |
| 5,234,574 A | 8/1993 | Tsuji et al. |
| 5,245,847 A | 9/1993 | Bando et al. |
| 5,246,565 A | 9/1993 | Mignardot |
| 5,422,191 A | 6/1995 | Childree |
| 5,466,360 A | 11/1995 | Ehrsam et al. |
| 5,601,695 A | 2/1997 | Muranushi |
| 5,643,434 A | 7/1997 | Benmalek et al. |

(Continued)

FOREIGN PATENT DOCUMENTS

CH   655134   3/1986

(Continued)

OTHER PUBLICATIONS

ASTM G-85 (1990) (no monthgiven).

(Continued)

Primary Examiner—Robert R. Koehler
(74) Attorney, Agent, or Firm—Stevens, Davis, Miller & Mosher, LLP

(57) ABSTRACT

The invention relates to a brazing sheet product including a core sheet, on at least one side of the core sheet a clad layer of an aluminum alloy including silicon in an amount in the range of 4 to 14% by weight, and further including on at least one outersurface of the clad layer a plated layer of nickel-tin alloy, such that the clad layer and all layers exterior thereto form a metal filler for a brazing operation and have a composition with the proviso that the mol-ratio of Ni:Sn is in the range of 10:(0.5 to 9). The invention further relates to a method of manufacturing an Al or Al alloy workpiece, which method includes the steps of: (a) providing an Al or Al alloy workpiece, (b) pre-treating the outersurface of the Al or Al alloy workpiece, and (c) plating a metal layer comprising nickel onto said outersurface of the Al or Al alloy workpiece, and wherein during step (c) the metal layer comprising nickel is deposited by plating a nickel-tin alloy using an aqueous plating bath including a nickel-ion concentration in a range of 2 to 50 g/l and a tin-ion concentration in the range of 0.2 to 20 g/l.

60 Claims, No Drawings

U.S. PATENT DOCUMENTS

| | | | |
|---|---|---|---|
| 5,961,853 A | 10/1999 | Thornton | |
| 5,997,721 A | 12/1999 | Limbach et al. | |
| 6,060,174 A | 5/2000 | Sabol et al. | |
| 6,129,262 A | 10/2000 | Cooper et al. | |
| 6,165,630 A | 12/2000 | Gehlhaar et al. | |
| 6,379,818 B1 | 4/2002 | Mooij et al. | |
| 6,383,661 B2 | 5/2002 | Wittebrood et al. | |
| 6,391,476 B2 | 5/2002 | Wittebrood et al. | |
| 6,503,640 B2 | 1/2003 | Wittebrood et al. | |
| 6,568,584 B2 | 5/2003 | Wittebrood et al. | |
| 6,599,645 B2 | 7/2003 | Wittebrood | |
| 6,796,484 B2 * | 9/2004 | Wittebrood et al. | 428/650 |
| 2002/0088717 A1 | 7/2002 | Wittebrood et al. | |
| 2002/0175205 A1 | 11/2002 | Wittebrood et al. | |
| 2003/0042146 A1 | 3/2003 | Wijenberg et al. | |
| 2003/0064242 A1 | 4/2003 | Wittebrood et al. | |
| 2003/0091856 A1 | 5/2003 | Wittebrood et al. | |
| 2003/0098338 A1 | 5/2003 | Dockus et al. | |
| 2003/0155409 A1 | 8/2003 | Dockus et al. | |
| 2003/0189082 A1 | 10/2003 | Dockus et al. | |
| 2003/0197050 A1 | 10/2003 | Graham et al. | |

FOREIGN PATENT DOCUMENTS

| | | |
|---|---|---|
| DE | 3821073 | 1/1989 |
| EP | 0227261 | 7/1987 |
| EP | 795048 | 9/1997 |
| FR | 2354171 | 1/1978 |
| FR | 2617868 | 1/1989 |
| GB | 1176688 | 1/1970 |
| GB | 2000525 | 1/1979 |
| JP | 54013430 | 1/1979 |
| JP | 5106059 | 4/1993 |
| JP | 11097298 | 4/1999 |
| WO | 9743467 | 11/1997 |
| WO | 0071781 | 11/2000 |
| WO | 0071784 | 11/2000 |
| WO | 0168312 | 9/2001 |
| WO | 0188226 | 11/2001 |
| WO | 0238326 | 5/2002 |
| WO | 02060639 | 8/2002 |
| WO | 02086197 | 10/2002 |
| WO | 03043777 | 5/2003 |
| WO | 03045618 | 6/2003 |
| WO | 03045619 | 6/2003 |

OTHER PUBLICATIONS

Bureau of Mines Technology, "Aluminium Soft-Soldering", 2301 N.T.I.S. Tech Notes (manufacturing), XP-002119816, 1985, Jan. No. 1G, Springfield, VA, pp. 12-13.

Wernick and Pinner, "The Surface Treatment and Finishing of Aluminium and its Alloys", $5^{th}$ edition, vol. 1, pp. 181-182 and pp. 191-203 (1988) (no month given).

Wernick and Pinner, "The Surface Treatment and Finishing of Aluminium and its Alloys", $5^{th}$ edition, vol. 2, pp. 1006-1022 and pp. 1023-1071 (Ch. 14-15)(Nov. 1988).

SAE Paper No. 880446 by B.E. Cheadle and K.F. Dockus, "Inert Atmosphere Fluxless Brazing of Aluminum Heat Exchangers", ICE, Detroit, Michigan, pp. 1-11 (Feb. 29-Mar. 4, 1988).

Adrianus Jacobus Wittebrood, Jacques Hubert Olga Joseph Wijenberg, Joop Nicolaas Mooij, "Nickel-Plated Aluminum Brazing Sheet" Research Disclosure, No. 439, pp. 1946-1947 (Nov. 2000).

SAE Paper No. P-263 by Kent Schölin and Bo Mannerskog, "Corrosion Resistant Aluminium Radiator Materials for Vacuum and Controlled Atmosphere Brazing" pp. 75-82, 1993 Vehicle Thermal Management Systems Conference Proceedings (no month given).

Greef, N. et al., "The Hydrogen Evolution Reaction", Instrumental Methods in Electrochemistry, pp. 233-236 (1990) (no month given).

Wijenberg et al., filed Jul. 18, 2003, U.S. Appl. No. 10/622,122 (unpublished).

U.S. Appl. No. 10/732,448, Wittebrood et al., filed Dec. 11, 2003 (unpublished).

U.S. Appl. No. 10/732,405, Wittebrood et al., filed Dec. 11, 2003 (unpublished).

* cited by examiner

BRAZING PRODUCT AND METHOD OF MANUFACTURING A BRAZING PRODUCT

CROSS REFERENCE TO RELATED APPLICATION

This is a continuation-in-part under 35 USC Section 120 of U.S. patent application Ser. No. 10/060,117 to Wittebrood et al., filed Jan. 31, 2002, now U.S. Pat. No. 6,796,484 B2.

FIELD OF THE INVENTION

The invention relates to a sheet brazing product and to a method of manufacturing an Al or Al alloy workpiece, such as a brazing sheet product, comprising the steps of providing an Al or Al alloy workpiece, pre-treating the outersurface of the Al or Al alloy workpiece, and plating a metal layer comprising nickel onto the outersurface of the pre-treated workpiece. The invention also relates to a brazed assembly comprising at least one component made of this brazing product manufactured according to this invention.

DESCRIPTION OF THE RELATED ART

Aluminum and aluminum alloys can be joined by a wide variety of brazing and soldering processes. Brazing, by definition, employs a filler metal or alloy having a liquidus above 450° C. and below the solidus of the base metal. Brazing is distinguished from soldering by the melting point of the filler metal: a solder melts below 450° C. Soldering processes are not within the field of the present invention.

Brazing products, and in particular brazing sheet products, find wide applications in heat exchangers and other similar equipment. Conventional brazing sheet products have a core or base sheet, typically an aluminum alloy of the Aluminum Association ("AA")3xxx-series, having on at least one surface of the core sheet an aluminum clad layer (also known as an aluminum cladding layer), the aluminum clad layer being made of an AA4xxx-series alloy comprising silicon in an amount in the range of 4 to 14% by weight, and preferably in the range of 7 to 14% by weight. The aluminum clad layer may be coupled to the core or base alloy in various ways known in the art, for example by means of roll bonding, cladding, explosive cladding, thermal spray-forming or semi-continuous or continuous casting processes.

Controlled Atmosphere Brazing ("CAB") and Vacuum Brazing ("VB") are the two main processes used for industrial scale aluminum brazing. Industrial vacuum brazing has been used since the 1950's, while CAB became popular in the early 1980's after the introduction of the NOCOLOK (trade mark) brazing flux. Vacuum brazing is an essentially discontinuous process and puts high demands on material cleanliness. The disruption of the aluminum oxide layer present is mainly caused by the evaporation of magnesium from the clad alloy. There is always more magnesium present in the furnace than necessary. The excess magnesium condenses on the cold spots in the furnace and has to be removed frequently. The capital investment for suitable equipment is relatively high.

CAB requires an additional process step prior to brazing as compared to VB, since a brazing flux has to be applied prior to brazing. A brazing flux for use in brazing aluminum alloys usually consist of mixtures of alkali earth chlorides and fluorides, sometimes containing aluminum fluoride or cryolite. CAB is essentially a continuous process in which, if the proper brazing flux is being used, high volumes of brazed assemblies can be manufactured. The brazing flux dissolves the oxide layer at brazing temperature allowing the clad alloy to flow properly. When the NOCOLOK flux is used the surface needs to be cleaned thoroughly prior to flux application. To obtain good brazing results the brazing flux has to be applied on the total surface of the brazed assembly. This can cause difficulties with certain types of assemblies because of their design. For example, because evaporator type heat exchangers have a large internal surface, problems can arise because of poor access to the interior. For good brazing results the flux has to adhere to the aluminum surface before brazing. Unfortunately the brazing flux after drying can easily fall off due to small mechanical vibrations. During the brazing cycle, corrosive fumes such as HF are generated. This puts a high demand on the corrosion resistance of the materials applied for the furnace.

Ideally, a material should be available that can be used for CAB but does not have the requirements and defects of the known brazing flux application. Such a material can be supplied to a manufacturer of brazed assemblies and is ready to use directly after forming of the assembly parts. No additional brazing fluxing operations have to be carried out. Presently, only one process for fluxless brazing is used on an industrial scale. The material for this process can be, for example, standard brazing sheet made from an AA3xxx-series core alloy clad on one or both sides with a cladding of an AA4xxx-series alloy. Before the brazing sheet can be used the surface has to be modified in such a way that the naturally occurring aluminum oxide layer does not interfere during the brazing cycle. The method of achieving good brazing is to deposit a specific amount of nickel on the surface of the clad alloy. If properly applied, the nickel reacts, presumably exothermically, with the underlying aluminum. When electroplating is used the adherence of the nickel should be sufficient to withstand typical shaping operations being used in for example heat exchanger manufacture.

Processes for nickel-plating in an alkaline solution of aluminum brazing sheet are known from each of U.S. Pat. No. 3,970,237, U.S. Pat. No. 4,028,200, and U.S. Pat. No. 4,164,454. According to these documents, nickel or cobalt, or combinations thereof, are most preferably deposited in combination with lead. The lead addition is used to improve the wetteability of the aluminum clad alloy during the brazing cycle. An important characteristic of these plating processes is that the nickel is preferentially deposited on the silicon particles of the aluminum clad alloy. To obtain sufficient nickel for brazing, the surface of the aluminum clad alloy should contain a relatively large number of silicon particles to act as nuclei for the nickel deposition. It is believed that to obtain sufficient nucleation sites a part of the aluminum in which the silicon particles are embedded should be removed before pickling by chemical and/or mechanical pre-treatment. This is believed a necessary condition to obtain sufficient silicon coverage to serve as nuclei for the plating action of the brazing or clad alloy. On a microscopic scale the surface of the Si-containing cladding of the brazing sheet is covered with nickel-lead globules. However, the use of lead for the production of a suitable nickel and/or cobalt layer on brazing sheet has several disadvantages. The use of lead for manufacturing products, such as automotive products, is undesirable and it is envisaged that in the very near future there might possibly even be a ban on lead comprising products or products manufactured via one or more intermediate processing steps comprising lead or lead-based components.

The international PCT patent application no. WO-00/71784, of J. N. Mooij et al., incorporated herein by reference in its entirety, discloses a brazing sheet product and a method of its manufacture. In this brazing sheet product there is provided a very thin bonding layer, preferably applied by plating, comprising zinc or tin between the AlSi-alloy clad layer and the nickel layer in order to improve the bonding of the nickel layer. The addition of lead to the nickel layer has been replaced by the addition of bismuth while maintaining the excellent brazeability characteristics of the brazing sheet product.

A drawback of the known brazing sheet products having a layer comprising nickel is the limited corrosion life of brazed products in a SWAAT-test in accordance with ASTM G-85. Post-braze corrosion lifetimes without perforations are typically in the range of 4 days and thereby restricting possible interesting applications of this brazing product. For several applications, of the known nickel-plated brazing sheet in brazed products, such a relatively short corrosion lifetime is not detrimental. However, a good corrosion resistance is considered a valuable property for brazing products used in, amongst others, heat exchangers, such as radiators and condensers. These heat exchangers are exposed to a severe external corrosive attack by, e.g., de-icing road salt.

SUMMARY OF THE INVENTION

It is an object of the present invention to provide a Ni-plated brazing sheet product for use in a brazing operation, ideally a fluxless CAB brazing operation, and wherein the brazing sheet product has an improved post-braze corrosion resistance when measured in a SWAAT-test in accordance with ASTM-G-85.

It is a further object of the present invention to provide a method of manufacturing Ni-plated brazing product for use in a brazing operation, ideally a fluxless CAB brazing operation, and wherein the resultant brazing product has an improved post-braze corrosion resistance when measured in a SWAAT-test in accordance with ASTM G-85.

It is another object of the present invention to provide a method of manufacturing a brazing sheet product comprising a core sheet made of an aluminum alloy coupled on at least one surface of the core sheet to an aluminum clad layer, the aluminum clad layer being made of an aluminum alloy comprising silicon in an amount in the range of 4 to 14% by weight, and a further layer comprising nickel on the outer surface of the aluminum clad layer such that taken together the aluminum clad layer and all layers exterior thereto form a filler metal for a brazing operation, and wherein the resultant brazing sheet product has an improved post-braze corrosion resistance when measured in a SWAAT-test in accordance with ASTM G-85.

DETAILED DESCRIPTION OF THE PREFERRED EMBODIMENTS

In accordance with the invention in one aspect there is provided a brazing sheet product having a core sheet, on at least one side of the core sheet a clad layer of an aluminum alloy comprising silicon in an amount in the range of 4 to 14% by weight, and further comprising on at least one outersurface of the clad layer a plated layer of nickel-tin alloy, such that the clad layer and all layers exterior thereto form a metal filler for a brazing operation and having a composition with the proviso that the mol-ratio of Ni:Sn is in the range of 10:(0.5 to 9), and preferably 10:(0.5 to 6).

With the brazing sheet product according to the invention there is achieved a post-braze corrosion lifetime without perforations according to ASTM G-85 of 6 days or more. The brazing sheet product can be fluxless brazed under controlled atmosphere conditions in the absence of a brazing flux material while achieving improved post-braze corrosion performance enhancing the possibilities of application of the Ni-plated brazing products.

The invention is based in part on the insight that it is believed that the cathodic reaction governs the overall corrosion rate of Ni-plated brazing products when tested in the SWAAT-test in accordance with ASTM G-85. It is speculated that the cathodic reaction in this system appears to be the Hydrogen Evolution Reaction ("HER"). When Ni-plated brazing products such as brazing sheets are being subjected to a brazing operation, typically a fluxless CAB operation, small Ni-aluminide particles are being formed which are believed to catalyze the HER. By the addition of tin in a sufficient amount to the metal filler and having a lower exchange current density for the HER as compared to nickel-aluminides the catalyst effect is reduced and the post-braze corrosion performance of the brazed product is being improved remarkably.

It is believed that an upper layer of pure tin metal is sensitive to progressive oxidation in pre-braze conditions under humid conditions, e.g., during transport of a plated coil to a customer. The surface oxides formed adversely influence the brazing process. By providing the tin required to improve the post-braze corrosion performance in the form of a plated nickel-tin alloy layer, no free tin is available anymore and thereby the occurrence of the detrimental progressive oxidation of the tin is avoided. It has been found that the plated Ni—Sn alloy layer forms a thin stable surface oxide film in air.

The invention in another aspect is characterized by a method of manufacturing an Al or Al alloy workpiece, which method comprises the steps of: (a) providing an Al or Al alloy workpiece, (b) pre-treating of the outersurface of the Al or Al alloy workpiece, and (c) plating a metal layer comprising nickel onto the outersurface of the Al or Al alloy workpiece, and wherein during step (c) the metal layer comprising nickel is deposited by plating a nickel-tin alloy using an aqueous plating bath comprising a nickel-ion concentration in a range of 2 to 50 g/l, and preferably 0.2 to 20 g/l., and a tin-ion concentration in the range of 0.2 to 20 g/l, and preferably 0.2 to 8 g/l.

According to this aspect of the invention there is provided a method of forming an Ni-plated aluminum brazing workpiece, ideally a brazing sheet product, with a plated nickel-tin alloy layer on the workpiece, the plated nickel-tin alloy layer improving the post-braze corrosion performance of the resultant product.

In an embodiment the outersurface of the workpiece in of an AlSi-alloy or an AlSi-alloy clad layer and all layers exterior thereto form a metal filler for a brazing operation and have a composition with the proviso that the mol-ratio of Ni:Sn is in the range of 10:(0.5 to 9), and preferably in the range of 10:(0.5 to 6). When the mol-ratio is too low no significant improvement in the post-braze corrosion life may be found. It has been found that if the mol-ratio becomes more than 10:6, then the brazeability becomes less efficient, while at a mol-ratio of more than 10:9 the brazeability becomes very poor.

In the plating bath used in the method according to the invention the nickel and tin ion concentration is such that the tin ion concentration should be in the range of 5 to 70 wt. %, and preferably in the range of 5 to 30 wt. %, in order to the arrive at the desired Ni:Sn mol-ratio in the plated layer. The balance in metal ions in made by nickel. Both the tin and nickel ions are preferably added to the plating bath in the form of salts, in particular as chloride salt ($NiCl_2 \cdot 6H_2O$ and $SnCl_2 \cdot 2H_2O$).

The aqueous plating bath may include a pyrophosphate as a complexing agent in a range of 0.2 to 2 M/l. For example, the aqueous plating bath may include at least one member of the group consisting of sodium pyrophosphate and potassium pyrophosphate in the range of 0.2 to 2 M/l as a complexing agent. The plating bath preferably comprises sodium pyrophosphate ($Na_4P_2O_7$) or potassium pyrophosphate ($K_4P_2O_7$) as a complexing agent for the metal ions in the bath. The pyrophosphate should be added in the range of 65 to 650 g/l, and preferably 100 to 350 g/l.

In addition to the pyrophosphate there should preferably be present a further complexing agent, preferably a α-amino acid to obtain a bright, fine-grained deposit. A very practical α-amino acid is glycine (amino acetic acid: $NH_2CH_2COOH$). Glycine shifts the polarization curve of nickel towards a more noble potential, while leaving the polarization curve of the tin practically unaffected. This further complexing agent should be present in a range of 4 to 50 g/l, preferably 5 to 40 g/l.

The overall balance of the Ni—Sn plating bath used in the method according to the invention, which comprises the components detailed above, is water. When practicing the plating method of the present invention, it is preferred to maintain the pH value of the plating bath at a level ranging from 6.5 to 9.0 throughout the plating operation, and preferably in the range of 7.5 to 8.5. If the pH value is less than 6.5 or if it exceeds 9, the stability of the metal ions present in the plating bath is significantly reduced.

The plating bath according to the present invention is substantially free of lead ions, and preferably the bath does not comprise any lead ions at all.

The aqueous plating bath demonstrated to be operational in a reasonable pH range, and at a wide temperature range of 30 to 70° C., and preferably 40 to 60° C., and further can be used in industrial scale coil plating lines using current densities up to about 4 A/dm$^2$, and preferably using current densities in the range of 0.4 to 3.0 A/dm$^2$. At too high current densities coarse deposits are obtained. Further advantages of this plating bath are that it does not generate any ammonia fumes, it does not use any components based on fluorides, it can be composed using standard and readily available chemicals, and the nickel ion and tin ion concentrations can easily be replenished to the plating bath from soluble anodes of these metals.

In a preferred embodiment all the nickel present for the metal filler used in the brazing operation is deposited simultaneously with the tin into a nickel-tin alloy. However, it is possible to firstly electroplate a thin nickel layer or nickel-bismuth layer, or vice versa, for example by using the aqueous Ni—Bi plating bath as set out in the international application WO-01/88226, and incorporated herein by reference, and on the outersurface of this first nickel or nickel-alloy layer there is plated the nickel-tin alloy layer. In the plated nickel-tin alloy layer the tin content should be increased to arrive at the desired Ni:Sn mol-ratio in the metal filler. However, this approach requires an additional plating step, and it is preferred to use one electroplating step only.

In an embodiment, taken together the aluminum base substrate and all layers exterior thereto form a metal filler for a brazing operation and have a composition comprising at least, by weight percent:
Si in the range of 5 to 14 %, for example 5 to 12%,
Ni in the range of 0.03 to 8%,
Sn in the range of 0.01 to 7%,
Bi in the range of at most 0.3%,
Sb in the range of at most 0.3%,
Zn in the range of at most 0.3%,
Mg in the range of at most 5%,
balance aluminum and inevitable impurities,
and with the proviso that the mol-ratio of Ni:Sn is in the range of 10:(0.5 to 9), and preferably in the range of 10:(0.5 to 6). The reasons for the limitations of the Ni:Sn mol-ratio have been set out above.

A typical impurity element in the filler metal is iron, in particular originating from the AlSi-alloy substrate or AlSi-alloy clad layer, and which may be tolerated up to about 0.8%. Other alloying elements may be present, and will typically originate from the aluminum base substrate or alternatively the aluminum clad layer. Typically each impurity element is present in a range of not more than 0.05%, and the total of the impurity elements does not exceed 0.3%.

Preferably the applied layer comprising the nickel-tin alloy has a thickness of at most 2.0 μm, preferably at most 1.0 μm, and more preferably in the range of 0.1 to 0.8 μm. A coating thickness of more than 2.0 μm requires a prolonged treatment time for plating, and may result in wrinkling of the molten filler metal during a subsequent brazing operation. A preferred minimum thickness for this nickel-tin alloy layer is about 0.25 μm. Also, other techniques such as dipping, thermal spraying, CVD, PVD or other techniques for depositing of metal alloys from a gas or vapor phase may be used. Preferably the nickel-tin alloy layer is essentially lead-free.

In an embodiment the Al or Al alloy workpiece is an aluminum alloy sheet or aluminum alloy wire or aluminum alloy rod. Although various aluminum alloys may be applied, e.g., those within the Aluminum Association (AA) 3xxx- and AA6xxx-series aluminum alloys, particular suitable aluminum alloys are those within the AA4xxx-series alloys, typically having Si as the most important alloying element in the range of 4 to 14% by weight, more preferably 7 to 14% by weight. Other alloying elements may be present to improve specific properties, the balance is made by iron up to 0.8%, and impurities each up to 0.05 wt. %, total up to 0.25 wt. %, and aluminum. An AA4xxx-series aluminum alloy sheet can be plated with Ni—Sn alloy in accordance with the method of the invention, and may be employed in subsequent brazing operations, in particular in an inert atmosphere brazing (CAB) operation in the absence of a brazing-flux material. Also, aluminum alloy wire or rods made of an AA4xxx-series alloy may be plated with a Ni—Sn alloy layer, and subsequently employed in brazing operations in particular in an inert atmosphere brazing (CAB) operation in the absence of a brazing-flux material, and may also be employed as weld filler wire or weld filler rod in a welding operation.

In a preferred embodiment the aluminum alloy workpiece is a brazing sheet product comprising a core sheet coupled on at least one surface of the core sheet to an aluminum clad layer, the aluminum clad layer being made of an aluminum AA4xxx-series alloy comprising silicon in the range of 4 to 14% by weight, preferably in the range of 7 to 14%.

In an embodiment of the aluminum brazing sheet product, the core sheet is made of an aluminum alloy, in particular those within the AA3xxx, AA5xxx, or AA6xxx-series aluminum alloys.

In a further embodiment the AlSi-alloy clad layer has a thickness ranging from about 2 to 20% of the total thickness of the total brazing product thickness. Typical AlSi-alloy clad layer thickness is in the range of 40 to 80 micron. The aluminum core sheet has a thickness typically in a range of at most 5 mm, more preferably in the range of 0.1 to 2 mm.

In an embodiment of the brazing sheet product it is further characterized by an optional applied thin layer comprising zinc as an intermediate bonding layer between the outersurface of the AlSi-alloy clad layer and the nickel-tin alloy plated layer. With the zinc comprising intermediate bonding layer a very effective bond between the AlSi-alloy clad layer and the nickel-tin layer is formed, the bond remaining effective during subsequent deformation of the brazing product, for example in a bending operation. Preferably, the intermediate bonding layer has a thickness of at most 0.5 µm, more preferably at most 0.3 µm (300 nm), and most preferably in the range of 0.01 to 0.15 µn (10–150 nm). In the best results obtained a thickness of about 30 nm has been used. It has been found that the thin bonding layer of zinc has no detrimental effect on the post-braze corrosion performance of the brazing product according to the invention.

The adhesion of the Ni—Sn alloy layer to the aluminum workpiece, such as the cladding of a brazing sheet product, is fairly good, but may be further improved by a proper pre-treatment of the outersurface of the aluminum workpiece on which the Ni—Sn alloy layer is being deposited, such as the AlSi-alloy clad layer of a brazing sheet product. The pre-treatment comprises a preliminary cleaning step during which the surface is made free from grease, oil, or buffing compounds. This can be accomplished in various ways, and can be done, amongst others, by vapor degreasing, solvent washing, or solvent emulsion cleaning. Also, a mild etching may be employed. Following the preliminary cleaning, the surface should preferably be conditioned. Several methods can be applied successfully, such as, those set out in the international application WO-01/88226 of J. N. Mooij et al., incorporated herein by reference, on page 9, line 29 to page 10, line 21.

Furthermore, the present invention is embodied in the use of this NiSn alloy pyrophosphate plating bath as set out above for the electrodeposition of a layer of nickel-tin alloy on the outersurface of an aluminum workpiece, preferably a brazing sheet product, for the manufacturing of Ni-plated products for use in a fluxless CAB brazing operation.

The invention further provides an assembly of components, for example a heat exchanger, typically for automotive applications, or a fuel cell, typically an electrochemical fuel cell, joined by brazing, whereby at least one of the components being the brazing sheet product or the brazing product obtained by the method set out above. The brazing operation is preferably carried out in an inert atmosphere (CAB) in the absence of a brazing flux material or under a vacuum.

In an embodiment there is provided a brazed assembly wherein at least one of the components to be joined by brazing is produced by the method in accordance with the invention described above, and at least one other component is made of steel, aluminized steel, stainless steel, plated or coated stainless steel, bronze, brass, nickel, nickel alloy, titanium, or plated or coated titanium.

EXAMPLE

On a laboratory scale tests were carried out on aluminum brazing sheets manufactured from an AA3003 core alloy roll clad on both sides with an AA4045 clad alloy, and having a total thickness of 0.5 mm and a clad layer thickness of 50 microns on both sides. The following sequential pre-treatment steps have been used for each sample:

cleaning by immersion for 180 sec. at 50° C. in ChemTec 30014 bath (a commercially available bath), followed by rinsing, alkaline etching for 20 sec. at 50° C. in ChemTec 30203 bath (a commercially available bath), followed by rinsing, desmutting for 60 sec. at room temperature in an acidic oxidizing solution, typically 50% nitric acid, followed by rinsing, zincate immersion using ChemTec 19023 bath (a commercially available zincate bath) for 60 sec. at room temperature resulting in a thin zinc layer having a thickness of about 30 nm, followed by rinsing.

Following the above pre-treatment on both sides a Ni—Sn alloy layer had been electroplated of variable tin-concentration using a pyrophosphate bath. The plating operating conditions were a pH of 8, a current density of $1A/dm^2$ and a plating bath temperature of 50° C. The pyrophosphate plating bath composition was as follows, with the balance of water:

30 g/l $NiCl_2.6H_2O$ (0.125 M)

four different levels of $SnCl_2.2H_2O$ 165 g/l $K_4P_2O_7$ (0.5 M)

20 g/l glycine

The Sn-concentration was varied to four different levels in order to vary the resultant tin-concentration of the applied Ni—Sn alloy layer (see also Table 1). The measured tin and nickel concentration in the plating baths have been measured using ICP (Induced Coupled Plasma). Also the nickel and tin concentrations in the resultant electroplated layer have been measured using ICP and given in Table 1.

For the assessment of the post-braze corrosion resistance, the samples have been subjected to a simulated brazing cycle. The samples were heated under flowing nitrogen, with heating from room temperature to 580° C., dwell time at 580° C. for 2 minutes, cooling from 580° C. to room temperature. All samples had an excellent brazeability. Following the brazing cycle four samples of each type of plated brazing sheet have been tested in a SWAAT until the first perforations expressed in days of testing appear according to ASTM G-85, and the average results are given in Table 2. The dimensions of the samples for the SWAAT-test were 100 mm×50 mm.

As a reference it is mentioned that typically aluminum brazing sheets manufactured from an AA3003 core alloy clad on both sides with an AA4045 clad alloy, and having a total thickness of 0.5 mm and a clad layer thickness of 50 microns each and devoid of any further metal layers have a SWAAT-test performance of more than 16 days without perforations after being subjected to the same simulated brazing cycle as the examples according to the invention.

As a further reference material also brazing sheet product (same core and clad layer composition and thickness) with a thin zinc bonding layer and only a NiBi-alloy electroplated layer manufactured according to the example of the international PCT application no. WO-01/88226, of J. N. Mooij et al., and incorporated herein by reference, has been tested for its corrosion performance after being subjected to the same simulated brazing cycle as the examples according to the invention.

For this example all products tested had the same AA3003-series core alloy.

This example shows how an electroplated nickel-tin alloy layer, and which is lead-free, can be applied on an aluminum workpiece, viz. an aluminum brazing sheet product, and achieving an excellent brazeability. Also, from the results of Table 2 it can be seen that by increasing the amount of tin with respect to the amount of nickel an improved post-braze SWAAT-test performance is obtained compared to the same brazing sheet product plated only with a known nickel layer comprising a small amount of bismuth to improve the flowability during the brazing operation. Tin may also reduce the surface tension of the molten metal filler during the brazing cycle and thereby improves the flowability of the molten filler metal. The amount of tin to improve the post-braze corrosion performance is by far sufficient to overcome the need for the addition of bismuth or antimony or magnesium added for the same purpose of reducing the surface tension. The combined addition of Sn with Bi and/or Sb and/or Mg remains still possible.

TABLE 1

The variable tin concentration in the plating bath and the composition of the resultant plated nickel-tin alloy layer.

| | Plating bath | | | Resultant Ni—Sn alloy layer | | |
|---|---|---|---|---|---|---|
| Example | Added $SnCl_2 \cdot 2H_2O$ (g/l) | ICP Sn-ion (g/l) | ICP Ni-ion (g/l) | Ni (g/m$^2$) | Sn (g/m$^2$) | Mol-ratio Ni:Sn |
| 1 | 1.1 | 0.58 | 7.57 | 3.85 | 0.77 | 10:1 |
| 2 | 2.2 | 1.14 | 7.50 | 3.30 | 1.32 | 10:2 |
| 3 | 3.3 | 1.67 | 7.37 | 3.39 | 2.11 | 10:3.1 |
| 4 | 4.4 | 2.17 | 7.21 | 3.48 | 2.67 | 10:3.8 |

TABLE 2

Post-braze corrosion performance of the example according to the invention and the comparative examples.

| Example | Mol-ratio Ni:Sn | Average SWAAT-test Result (days) |
|---|---|---|
| 1 | 10:1 | 6 |
| 2 | 10:2 | 7 |
| 3 | 10:3.1 | 8 |
| 4 | 10:3.8 | 8 |
| NiBi | — | 4 |
| Standard AA3003 with AA4045 | — | 16 |

Having now fully described the invention, it will be apparent to one of ordinary skill in the art that many changes and modifications can be made without departing from the spirit or scope of the invention as hereon described.

The invention claimed is:

1. A brazing sheet product comprising a core sheet, on at least one side of said core sheet a clad layer of an aluminum alloy comprising silicon in an amount in the range of 4 to 14% by weight, and further comprising on at least one outersurface of said clad layer a layer of nickel-tin alloy, such that the clad layer and all layers exterior thereto form a metal filler for a brazing operation and having a composition with the proviso that the mol-ratio of Ni:Sn is in the range of 10:(0.5 to 9).

2. A brazing sheet product according to claim 1, wherein the mol-ratio of Ni:Sn is in the range of 10:(0.5 to 6).

3. A brazing sheet product according to claim 1, wherein the layer of nickel-tin alloy is a plated layer.

4. A brazing sheet product according to claim 1, wherein the layer of nickel-tin alloy is applied via a technique selected from the group consisting of dipping, thermal spraying, chemical vapor deposition, physical vapor deposition.

5. A brazing sheet product according to claim 1, wherein the layer of nickel-tin alloy is essentially lead-free.

6. A brazing sheet product according to claim 1, wherein the layer of nickel-tin alloy has a thickness of at most 2.0 μm.

7. A brazing sheet product according to claim 1, wherein the layer of nickel-tin alloy has a thickness of at most 1.0 μm.

8. A brazing sheet product according to claim 1, wherein the layer of nickel-tin alloy has a thickness in a range of 0.1 to 0.8 μm.

9. A brazing sheet product according to claim 1, wherein the layer of nickel-tin alloy has a thickness in a range of 0.25 to 0.8 μm.

10. A brazing sheet product according to claim 1, wherein there is provided a layer comprising zinc as a bonding layer between the outersurface of the AlSi-alloy clad layer and the nickel-tin alloy layer.

11. A brazing sheet product according to claim 10, wherein the bonding layer has a thickness of at most 0.5 μm.

12. A brazing sheet product according to claim 10, wherein the bonding layer has a thickness of at most 0.3 μm.

13. A brazing sheet product according to claim 10, wherein the bonding layer has a thickness of in a range of 0.01 to 0.15 μm.

14. A brazing sheet product according to claim 1, wherein the core sheet is made of an aluminum alloy.

15. A brazing sheet product according to claim 1, wherein the core sheet is made of an aluminum alloy selected from the group consisting of AA3xxx, AA5xxx and AA6xxx-series aluminum alloys.

16. A brazing sheet product according to claim 1, wherein the brazing sheet product has a post-braze corrosion life of 6 days or more in a SWAAT-test without perforations in accordance with ASTM G-85.

17. A method of manufacturing a product, which method comprises the steps of:
   (a) providing an Al or Al alloy workpiece,
   (b) pre-treating of the outersurface of the Al or Al alloy workpiece, and
   (c) plating a metal layer comprising nickel onto said outersurface of the Al or Al alloy workpiece, wherein during step (c) said metal layer comprising nickel is deposited by plating a nickel-tin alloy using an aqueous plating bath comprising a nickel-ion concentration in a range of 2 to 50 g/l and a tin-ion concentration in the range of 0.2 to 20 g/l.

18. A method according to claim 17, wherein during step (c) the electroplated layer has a composition such that the mol-ratio of Ni:Sn is in the range of 10:(0.5 to 9).

19. A method according to claim 17, wherein during step (c) the electroplated layer has a composition such that the mol-ratio of Ni:Sn is in the range of 10:(0.5 to 6).

20. A method according to claim 17, wherein taken together said aluminum base substrate and all layers exterior thereto form a metal filler for a brazing operation and having a composition comprising at least, by weight percent:
   Si in the range of 5 to 14%,
   Ni in the range of 0.03 to 8%,
   Bi in the range of at most 0.3%,
   Sb in the range of at most 0.3%,
   Sn in the range of 0.01 to 7%, Zn in the range of at most 0.3%,
Mg in the range of at most 5%,
balance aluminum and inevitable impurities,
with the proviso that the mol-ratio of Ni:Sn is in the range of 10:(0.5 to 9).

21. A method according to claim 17, wherein the aqueous plating bath has a pH in the range of 6.5 to 9.0.

22. A method according to claim 17, wherein the aqueous plating bath has a pH in the range of 7.5 to 8.5.

23. A method according to claim 17, wherein the aqueous plating bath further comprises a pyrophosphate as a complexing agent in a range of 0.2 to 2 M/l.

24. A method according to claim 17, wherein the aqueous plating bath further comprises a further complexing agent in the form of an α-amino acid.

25. A method according to claim 17, wherein the aqueous plating bath further comprises a further complexing agent in the form of an α-amino acid in the form of amino acetic acid.

26. A method according to claim 17, wherein the layer of nickel-tin alloy has a thickness of at most 2.0 μm.

27. A method according to claim 17, wherein the layer of nickel-tin alloy has a thickness of at most 1.0 μm.

28. A method according to claim 17, wherein the layer of nickel-tin alloy has a thickness in a range of 0.1 to 0.8 μm.

29. A method according to claim 17, wherein the layer of nickel-tin alloy has a thickness in a range of 0.25 to 0.8 μm.

30. A method according to claim 17, wherein the product is a brazing sheet comprising a core sheet coupled on at least one surface of said core sheet to an aluminum clad layer, the aluminum clad layer being made of an aluminum alloy comprising silicon in an amount in the range of 4 to 14% by weight, and wherein during step (b) at least the outersurface of the aluminum clad alloy is being pre-treated.

31. A method according to claim 30, wherein the core sheet of the brazing sheet is made of an aluminum alloy.

32. A method according to claim 31, wherein the core sheet of the brazing sheet is made of an aluminum alloy selected from the group consisting of AA3xxx, AA5xxx, and AA6xxx-series aluminum alloys.

33. Method of use of an aqueous plating bath for manufacturing Ni-plated products for use in a fluxless CAB brazing operation comprising:
electrodepositing a layer of nickel-tin alloy on an Al or Al alloy workpiece within the aqueous bath, the aqueous bath having a pH in the range of 6.5 to 9.0, and comprising
(i) Ni ions in the range of 2 to 50 g/l.,
(ii) Sn ions in the range of 0.2 to 20 g/l,
(iii) at least one member of the group consisting of sodium pyrophosphate and potassium pyrophosphate thereof in the range of 0.2 to 2 M/l as a complexing agent,
(iv) a further complexing agent, and a balance of water.

34. Method of use according to claim 33, wherein the aqueous bath having a pH in the range of 7.5 to 8.5.

35. Method of use according to claim 33, wherein the pyrophosphate is present in a range of 65 to 650 g/l.

36. Method of use according to claim 33, wherein the pyrophosphate is present in a range of 100 to 350 g/l.

37. Method of use according to claim 33, wherein the further complexing agent is in the form of an α-amino acid.

38. Method of use according to claim 33, wherein the further complexing agent is in the form of an α-amino acid and wherein the α-amino acid is amino acetic acid.

39. Method of use according to claim 33, wherein the further complexing agent is present in a range of 4 to 50 g/l.

40. Method of use according to claim 33, wherein the further complexing agent is present in a range of 5 to 40 g/l.

41. Method of use according to claim 33, wherein the aqueous plating bath is substantially free of lead ions.

42. An assembly of components joined by brazing, and wherein at least one said components being a brazing sheet product according to claim 1.

43. An assembly of components joined by brazing, and wherein at least one of said components being the product obtained by the method according to claim 17.

44. An assembly according to claim 42, wherein the components are joined by means of a brazing operation in an inert atmosphere in the absence of a brazing flux material.

45. An assembly according to claim 42, wherein the components are joined by means of a brazing operation using a vacuum.

46. An assembly according to claim 42, wherein the parts made from said brazing sheet product have a post-braze corrosion life of 6 days or more in a SWAAT-test without perforations in accordance with ASTM G-85.

47. An assembly according to claim 42, wherein at least one other of said components comprises a material selected from the group consisting of steel, aluminized steel, stainless steel, plated or coated steel, plated or coated stainless steel, bronze, brass, nickel, nickel alloy, titanium, and plated or coated titanium.

48. An assembly according to claim 42, wherein the assembly is a heat exchanger for automotive application.

49. An assembly according to claim 42, wherein the assembly is a fuel cell.

50. An assembly according to claim 42, wherein the assembly is an electrochemical fuel cell.

51. An assembly according to claim 43, wherein the components are joined by means of a brazing operation in an inert atmosphere in the absence of a brazing flux material.

52. An assembly according to claim 43, wherein the components are joined by means of a brazing operation using a vacuum.

53. An assembly according to claim 43, wherein the parts made from said brazing sheet product have a post-braze corrosion life of 6 days or more in a SWAAT-test without perforations in accordance with ASTM G-85.

54. An assembly according to claim 43, wherein at least one other of said components comprises a material selected from the group consisting of steel, aluminized steel, stainless steel, plated or coated steel, plated or coated stainless steel, bronze, brass, nickel, nickel alloy, titanium, and plated or coated titanium.

55. An assembly according to claim 43, wherein the assembly is a heat exchanger for automotive application.

56. An assembly according to claim 43, wherein the assembly is a fuel cell.

57. An assembly according to claim 43, wherein the assembly is an electrochemical fuel cell.

58. A method according to claim 17, wherein the pyrophosphate is selected from at least one member of the group consisting of sodium pyrophosphate and potassium pyrophosphate.

59. An assembly according to claim 43, wherein the nickel-tin alloy metal layer of the product being joined by brazing has a liquidus above 450° C. and below the solidus of the Al or Al alloy workpiece.

60. An assembly according to claim 43, wherein the nickel-tin alloy metal layer of the product being joined by brazing has a thickness of at most 2.0 μm.

* * * * *

UNITED STATES PATENT AND TRADEMARK OFFICE
CERTIFICATE OF CORRECTION

PATENT NO. : 6,994,919 B2 Page 1 of 1
APPLICATION NO. : 10/621601
DATED : February 7, 2006
INVENTOR(S) : Wijenberg et al.

It is certified that error appears in the above-identified patent and that said Letters Patent is hereby corrected as shown below:

On Title page item [73]
Assignees Reads "Corus Aluminium Walzprodukte GmbH, Koblenz (DE); Corus Technology BV, IJmuiden (NL)" should read--Corus Aluminium Walzprodukte GmbH, Koblenz (DE)--

Signed and Sealed this

Sixth Day of March, 2007

JON W. DUDAS
*Director of the United States Patent and Trademark Office*